United States Patent
Dong et al.

(10) Patent No.: US 7,892,699 B2
(45) Date of Patent: Feb. 22, 2011

(54) FLOW FIELD PLATES FOR FUEL CELLS

(75) Inventors: Junqing Dong, Shenzhen (CN);
Zhiqiang Zhao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1001 days.

(21) Appl. No.: 11/511,614

(22) Filed: Aug. 28, 2006

(65) Prior Publication Data
US 2007/0048591 A1    Mar. 1, 2007

(30) Foreign Application Priority Data
Aug. 26, 2005    (CN) .................... 2005 1 0092995

(51) Int. Cl.
*H01M 4/64* (2006.01)
*H01M 4/66* (2006.01)

(52) U.S. Cl. ........................... 429/518; 429/517

(58) Field of Classification Search ............. 429/231.95
See application file for complete search history.

(56) References Cited
U.S. PATENT DOCUMENTS
6,878,477 B2 *   4/2005   Frank et al. .............. 429/34

2002/0142201 A1 * 10/2002 Nelson ........................ 429/26
2003/0031914 A1 *  2/2003 Frank et al. ............... 429/35

* cited by examiner

*Primary Examiner*—Dah-Wei D Yuan
*Assistant Examiner*—Steven Scully
(74) *Attorney, Agent, or Firm*—Venture Pacific Law, PC

(57) ABSTRACT

This invention provides a type of cathode flow field plate for fuel cells. The cathode flow field plate comprises a cooling flow field and a reacting flow field, gas entrances, gas exits and plate ribs. Here, an end of said flow field is connected to the gas entrances. The other end is connected to the gas exits. Said cooling flow field comprises of a distributing rib. Said distributing rib is located between the gas entrances and the gas exits. There are connecting pores between said gas entrances and the distributing rib. The cathode flow field plate for fuel cells provided in this invention uses the distributing rib and the connecting pores to divide the gas into cooling gas and reacting gas. Since a single gas source is used, the only parameter subject to adjustment is the total amount of gas flow. Thus the control of the gases is relatively simple. The devices controlling the sources of the cooling gas and the reacting gas can be minimized. Therefore, the fuel cells using the flow field plate provided in this invention can be low in cost.

16 Claims, 1 Drawing Sheet

FLOW FIELD PLATES FOR FUEL CELLS

CROSS REFERENCE

This application claims priority from a Chinese patent application entitled "Flow field plates for fuel cells" filed on Aug. 26, 2005, having a Chinese Application No. 200510092995.X. This application is incorporated herein by reference in its entirety.

FIELD OF INVENTION

This invention relates to the field of fuel cells, and, in particular, it relates to flow field plates for fuel cells.

BACKGROUND

In the current gas-cooled fuel cell systems, the cooling field and the reacting field on the two sides of the cathode flow field plate are not connected. The cooling gas and the reacting gas are supplied by different gas-supply systems. The cooling gas is normally supplied using an independent fan. Generally, the gas pressure is within a few hundred Pa (measured with barometer; same as described below). For the reacting gas, depending on the operating pressure, a fan or a gas-pump is used to supply the reacting gas, and the pressure ranges from a few hundred Pa to a few atoms. Depending on the environment, different gas-supply system can be used. The system controls the respective rate of flow of the reacting gas and the cooling gas, and the pressure of the reacting gas is also adjustable, thereby accurately controlling the level of humidity of the membrane electrode assembly in a fuel cell. Thus the fuel cell operates under a desirable humidity condition and maintains desirable electricity generation performance. However, there are disadvantages associated with a cathode flow field plate with separated cooling and reacting gases. For example, the control systems are relatively complicated, and the gases are relatively difficult to control. The complexity of a control system for a small fuel cell group generating a few hundred-watts is comparable to that of a large fuel cell group generating over ten kilowatts. Therefore, the cost for small fuel cell groups generating below a kilowatt remains high thus hindering the process of commercialization.

SUMMARY OF THE INVENTION

An object of this invention is to provide flow field plates for fuel cells that allow easy control of gas flow in the fuel cell.

Another object of this invention is to provide low cost fuel flow plates for fuel cells.

Briefly, this invention provides a type of cathode flow field plate for fuel cells. The cathode flow field plate comprises a cooling field, a reacting field, a gas entrance, a gas exit, and a distributing rib. Said cooling field and said reacting field are on the two sides of said cathode flow field plate. The cooling field comprises a single or a plurality of parallel cooling channels. The reacting field comprises a single or a plurality of parallel reacting channels. The channels are separated by distributing ribs. Here, an end of said flow field is connected to the gas entrances. The other end is connected to the gas exits. Said cooling flow field comprises of distributing ribs. Said distributing ribs is located between the gas entrances and the gas exits. There are connecting pores between said gas entrances and the distributing ribs.

On a cathode flow field plate of this invention, when gas enter the channels of the cooling field through the gas entrances, part of the gas is blocked by the distributing rib. Thus, after being blocked, part of the gas flows into the channels of the reacting field on the other side of the flow field plate through the connecting pores. Thereby, at the same time, the gas enters through the entrance of the cooling field. The distributing rib and the connecting pores divide the gases into cooling gas and reacting gas. The gas flowing between the distributing rib is cooling gas. It is directly released though the cooling channels, carrying away the heat generated during the reactions. The gas not flowing through the distributing rib enters the reacting channels on the other side of the flow field plate through the connecting pores, become the reacting gas, and supplies the fuel cell with such reacting gas. The exhaust gas is released though a gas exit 6 on the other side of the reacting field. The cooling gas and reacting gas of the cathode flow field plate for fuel cells of this invention are from the same gas source. Thus, unlike using different gas sources, there is only one parameter subject to adjustment which is the rate of total gas flow. For a flow field plate of this invention, the control of gas is relatively simple, and the instruments controlling the sources of the cooling and reacting gases can be omitted. Therefore, a fuel cell having the flow field plate of this invention incurs relatively low costs, thereby benefiting the commercialization of the cell.

An advantage of this invention is that it provides flow field plates for fuel cells that allow easy control of gas flow in the fuel cell.

Another advantage of this invention is that it provides low cost fuel flow plates for fuel cells.

FIGURES

The following are further descriptions of the invention with references to figures and examples of their applications.

DETAILED DESCRIPTION OF THE PREFERRED EMBODIMENTS

Figure 1:
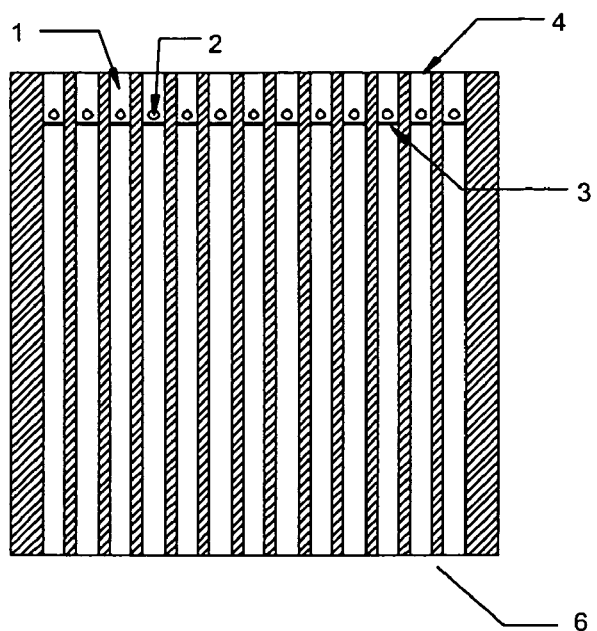
FIG. 1 is an illustration of the cooling field on a side of a cathode flow field plate for fuel cells of this invention.
Figure 2:
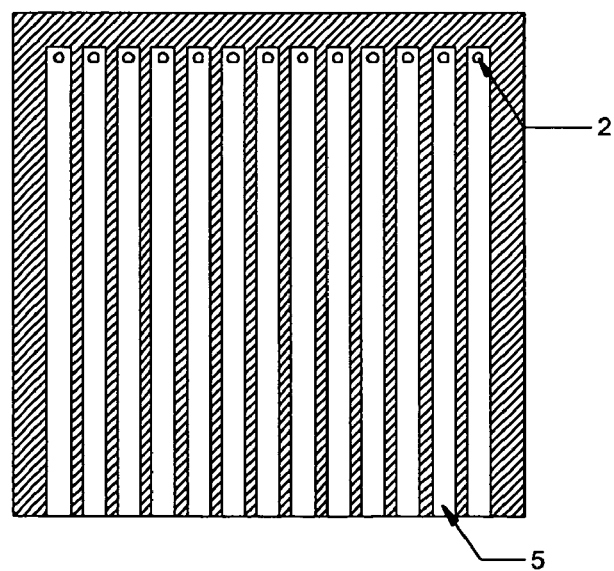
FIG. 2 is an illustration of the reacting field on the other side of a cathode flow field plate for fuel cells of this invention.
Figure 3:
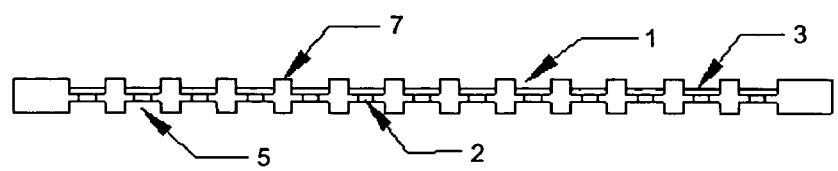
FIG. 3 is a cross-section of the cathode flow field plate for fuel cells of this invention.

As shown in FIGS. 1, 2, and 3, this invention provides a type of cathode flow field plate for fuel cells. The cathode flow field plate comprises a cooling field, a reacting field, a gas entrance 4, a gas exit 6, and a distributing rib 7. Said cooling field and reacting field are located on two sides (a first side and a second side) of said cathode flow field plate. The cooling field comprises a single channel or a plurality of parallel cooling channels 1. The reacting field comprises a single channel or a plurality of parallel channels 5. The channels 1 or 5 are separated by the distributing ribs 7. Here, an end of said cooling field is connected to said gas entrance 4. The other end of the cooling field is connected to said gas exit 6. Said cooling channel 1 comprises a distributing rib 3. The distributing rib 3 is located between the gas entrance 4 and the gas exit 6. One or more connecting pores 2 located between said gas entrance 4 and said distributing rib 3 go through the cathode flow field plate.

Said distributing rib 3 is plate-shaped or block-shaped. A cross-section of the distributing rib 3 can be of various shapes. Preferably, the shape of a cross-section is rectangular with or without a pore, or trapezoid with or without a pore.

The cross-sectional area of said distributing rib is 10%-100% of the cross sectional area of the cooling channel.

Preferably, the ratio is 15%-80%, provided that the gases can go through. The upper limit can be 100% because even if the ratio reaches the limit of 100%, the anode flow field plate opposites the cathode flow field plate also has channels for gas flow.

The thickness of said distributing rib 3 along the length of the cooling channel is 0.5%-10% of the length of the cooling channel. Preferably, the ratio is 1%-4%. Thus gas flow is partially blocked and the gas flow after passing over the distributing rib 3 is facilitated.

The number of said distributing rib 3 can be one or more than one. Preferably, the number should be the same as that of the cooling channel 1.

Preferably, said distributing rib 3 is parallel to the edge of the flow field plate where the gas entrance is located. The distance between said distributing rib and the edge of the flow field plate where the gas entrance is located is less than the distance between said distributing rib and the edge of the flow field plate where the gas exit is located. The ratio of the distances falls in the range of 1:2 to 1:100, preferably 1:5 to 1:20.

Said connecting pores 2 can be of any shape. For the purpose of easy manufacturing, the preferred shape is round. The number of said connecting pores can be one or more, preferably same as the number of the distributing rib 3 segments. Note that a distributing rib segment can be dispose in each channel to form the distributing rib as a whole, where each channel may or may not have a segment. Furthermore, each segment can be of different size, shape, height, etc.

Preferably, the diameter of the connecting pore 2 does not exceed the width of the cooling channel. The ratio of the diameter of the connecting pore 2 and the width of the cooling channel 1 is in the range of 0.2:1 to 1:1, preferably 0.3:1 to 0.6:1.

When there is a plurality of connecting pores 2, a line through the centers of the circles of said connecting pores 2 would be parallel to the edge of the flow field plate where the gas entrance 4 is located. Preferably, the distance from the center of the circle of the connecting pore 2 or this line through the centers of the circles of the connecting pores to the edge of the cathode flow field plate where the gas entrance 4 is located is greater than the distance from the center of the circle of the connecting pore or this line through the centers of the circles of the connecting pores to the distributing rib 3. The ratio of the distances can be 2:1 to 15:1, preferably, 4:1 to 8:1.

If the diameter of the connecting pore 2 is excessively large, or if the distributing rib 3 is excessively high, more gases would flow back. Thus there would be a greater amount of reacting gas, and the membrane electrode assembly would become dry. If the diameter of the connecting pore 2 is too small, or if the distributing rib 3 is too low, less gas would flow back. Thus there would be a greater amount of cooling gas, and the membrane electrode assembly would become humid. Therefore, the diameter of the connecting pore 2 and the height of the distributing rib 3 can be determined by the desired level of humidity of the membrane electrode assembly.

Said cathode flow field plate can be made of one or a combination of conductive carbon plate and non-corrosive metal plate. Said non-corrosive metal plate can be one of the non-corrosive materials, including nickel, stainless steel, titanium, gold, etc., generally known to a person of ordinary skill in the art.

The thickness of said cathode flow field plate can be determined by the requirement of the fuel cell, preferably 1.5-5 mm.

Said cooling channel 1 or reacting channel 5 can be of shapes known to a person of ordinary skill in the art, such as waveform-like or comb-like, preferably comb-like.

A cross-section of said cooling channel 1 or reacting channel 5 can be of shapes known to a person of ordinary skill in the art, such as rectangular or trapezoid, preferably, rectangular.

The width and depth of the cooling channel 1 or the reacting channel 5 can be the conventional width and depth of the cooling channel 1 or the reacting channel 5. For example, the width can be 1.5-6 mm, preferably, 2.5-4 mm. The depth (i.e., the height of the distributing rib 7) can be 0.4-2 mm, preferably 0.8-1.5 mm. The maximum length is limited to the length of the cathode flow field plate, preferably, 40-80 mm. The number of the cooling channel 1 or reacting channel 5 is known to a person of ordinary skill in the art, preferably, 3-50, and preferably, 10-20. Preferably, the width, depth, length, and the number of the cooling channel 1 are the same as those of the reacting channel 5.

On a cathode flow field plate of this invention, when gas enters the channel 1 of the cooling field through the gas entrances, part of the gas is blocked by the distributing rib 3. Thus, after being blocked, part of the gas flows into the channels 5 of the reacting field on the other side of the flow field plate through the connecting pores 2. Thereby, at the same time, the gas enters through the entrance 4 of the cooling field. The distributing rib 3 and the connecting pores 2 divide the gas into cooling gas and reacting gas. The gas flowing between the distributing rib 3 is cooling gas. They are directly released though the cooling channel 1, carrying away the heat generated during the reactions. The gas not flowing between the distributing rib 3 enters the reacting channel 5 on the other side of the flow field plate through the connecting pores 2, and supplies the fuel cell with reacting gas. The exhaust gas is released though a gas exit 6 on the other side of the reacting field. The cooling gas and reacting gas of the cathode flow field plate for fuel cells of this invention are from the same gas source. Thus, unlike using different sources of gases, there is only one parameter subject to adjustment which is the rate of total gas flow. For a flow field plate of this invention, the control of gas is relatively simple, and the instruments controlling the sources of the cooling and reacting gases can be omitted. Therefore, a fuel cell having the flow field plate of this invention incurs relatively low costs, thereby benefiting the commercialization of the fuel cell.

The following embodiments further illustrate this invention.

Embodiment 1

This embodiment provides a cathode flow field plate for fuel cells of this invention.

Said cathode flow field plate can be a carbon plate with a length and width of 60 mm, and a thickness of 2.5 mm. Said cooling field can comprise 13 cooling channels 1. The cooling channel 1 can have a width of 2.7 mm, a depth of 1.2 mm, and a length of 60 mm. Said reacting field can comprise 13 reacting channels 5. The reacting channel 5 can have a width of 2.8 mm, a depth of 0.8 mm, and a length of 56 mm. A cross-section of said distributing rib 3 can have a rectangular shape with a width of 2.7 mm and a height of 0.5 mm. The cross-sectional area of the distributing rib can be 42% of the cross-sectional area of the channel. Along the length of the cooling channel 1, the thickness of the distributing rib 3 can be 0.4 mm, being 0.7% of the length of the cooling channel 1. Said distributing rib 3 is straight and the distance is 6.2 mm from the distributing rib 3 to the edge of the cathode flow field where the gas entrance 4 is located. The ratio of this distance and the distance from the distributing rib 3 to the edge where the gas exit 6 is located can be 1:8.6. The number of said connecting pores 2 can be 13, and the pores can be round with a diameter of 1.2 mm. The ratio of that diameter and the width of the channel can be 0.44:1. The pores can be parallel to each other. A line through the centers of the circles of said connecting pores can be parallel to the edge of the flow field plate where the gas entrance is located. The distance from this line to the edge of the cathode flow field plate can be 5.2 mm. The ratio of the distance from this line to the edge of the cathode flow field plate where the gas entrance 4 is located and from this line to the distributing rib can be 5.2:1.

To assemble a cell unit having a cathode flow field plate of this embodiment, the anode flow field plate can be the same conventional flow field plate with a waveform-like single channel, having the same area and made of the same material. The membrane electrode assembly can comprise a Nafion® 112 proton-exchange membrane of the Dupont Company having an effective area of 24 cm$^2$, and a platinum-over-carbon catalyst having 40 wt % of platinum, with the catalyzing layer of platinum being 0.4 g/cm$^2$. The cell unit uses pure hydrogen gas as fuel and air as the oxidizing gas. The cell unit generates electricity in an environment of 20° C. and a relative humidity of 30%. The pressure of the hydrogen gas can be 0.03 MPa. The rate of the hydrogen gas flow can be 105% of the theoretical rate of flow. The air pressure can be 200 Pa, and the rate of total air flow can be 1.5 m$^3$/hr. The electricity generated can be 0.6V/14 A.

Embodiment 2

This embodiment provides a cathode flow field plate for fuel cells of this invention.

Said cathode flow field plate can be a carbon plate with a length of 100 mm, a width of 70 mm, and a thickness of 2.5 mm. Said cooling field can comprise 15 cooling channels 1. The cooling channel 1 can have a width of 3.0 mm, a depth of 1.2 mm, and a length of 100 mm. Said reacting field can comprise 15 reacting channels 5. The reacting channel 5 can have a width of 2.8 mm, a depth of 0.8 mm, and a length of 94 mm. A cross-section of said distributing rib 3 can have a rectangular shape with a width of 3.0 mm and a height of 0.2 mm. The cross-sectional area of the distributing rib can be 17% of the cross-sectional area of the channel. Along the length of the cooling channel 1, the thickness of the distributing rib 3 can be 1.5 mm, being 1.5% of the length of the cooling channel 1. Said distributing rib 3 is straight and the distance is 8.8 mm from the distributing rib 3 to the edge of the cathode flow field where the gas entrance 4 is located. The ratio of this distance and the distance from the distributing rib 3 to the edge where the gas exit 6 is located can be 1:10.2. The number of said connecting pores 2 can be 15, and the pores can be round with a diameter of 1.8 mm. The ratio of that diameter and the width of the channel can be 0.6:1. The pores can be parallel to each other. A line through the centers of the circles of said connecting pores can be parallel to the edge of the flow field plate where the gas entrance is located. The distance from this line to the edge of the cathode flow field plate can be 7.4 mm. The ratio of this distance from this line to the edge of the cathode flow field plate where the gas entrance 4 is located and that from this line to the distributing rib can be 5.3:1.

To assemble a cell unit having a cathode flow field plate of this embodiment, the anode flow field plate can be the same conventional flow field plate with a waveform-like single channel, having the same area and made of the same material. The membrane electrode assembly can comprise a Nafion® 112 proton-exchange membrane of the Dupont Company having an effective area of 51 cm$^2$, and a platinum-over-carbon catalyst having 40 wt % of platinum, with the catalyzing layer of platinum being 0.4 g/cm$^2$. The cell unit uses pure hydrogen gas as fuel and air as the oxidizing gas. The cell unit generates electricity in an environment of 25° C. and a relative humidity of 65%. The pressure of the hydrogen gas can be 0.03 MPa. The rate of the hydrogen gas flow can be 105% of the theoretical rate of flow. The air pressure can be 200 Pa, and the rate of total air flow can be 2.5 m$^3$/hr. The electricity generated can be 0.6V/26 A.

Embodiment 3

This embodiment provides a cathode flow field plate for fuel cells of this invention.

Said cathode flow field plate can be a carbon plate with a length of 50 mm, a width of 30 mm, and a thickness of 2.0 mm. Said cooling field can comprise 10 cooling channels 1. The cooling channel 1 can have a width of 2.5 mm, a depth of 0.8 mm, and a length of 50 mm. Said reacting field can comprise 10 reacting channels 5. The reacting channel 5 can have a width of 2.6 mm, a depth of 0.7 mm, and a length of 46.5 mm. A cross-section of said distributing rib 3 can have a rectangular shape with a width of 0.6 mm and a height of 0.6 mm. The cross-sectional area of the distributing rib can be 75% of the cross-sectional area of the channel. Along the length of the cooling channel 1, the thickness of the distributing rib 3 can be 0.5 mm, being 1% of the length of the cooling channel 1. Said distributing rib 3 is straight and the distance is 5.1 mm from the distributing rib 3 to the edge of the cathode flow field where the gas entrance 4 is located. The ratio of this distance and the vertical distance from the distributing rib 3 to the edge where the gas exit 6 is located can be 1:8.7. The number of said connecting pores 2 can be 10, and the pores can be round with a diameter of 0.8 mm. The ratio of that diameter and the width of the channel can be 0.32:1. The pores can be parallel to each other. A line through the centers of the circles of said connecting pores can be parallel to the edge of the flow field plate where the gas entrance is located. The distance from this line to the edge of the cathode flow field plate can be 4.3 mm. The ratio of the distance from the line to the edge of the cathode flow field plate where the gas entrance 4 is located and that from the line to the distributing rib can be 5.4:1.

To assemble a cell unit having a cathode flow field plate of this embodiment, the anode flow field plate can be the same conventional flow field plate with a waveform-like single channel, having the same area and made of the same material. The membrane electrode assembly can comprise a Nafion® 112 proton-exchange membrane of the Dupont Company having an effective area of 8 cm$^2$, and a platinum-over-carbon catalyst having 40 wt % of platinum, with the catalyzing layer of platinum being 0.4 g/cm$^2$. The cell unit uses pure hydrogen gas as fuel and air as the oxidizing gas. The cell unit generates electricity in an environment of 20° C. and a relative humidity of 30%. The pressure of the hydrogen gas can be 0.03 MPa. The rate of the hydrogen gas flow can be 105% of the theoretical rate of flow. The air pressure can be 200 Pa, and the rate of total air flow can be 0.6 m$^3$/hr. The electricity generated can be 0.6V/5.0 A.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A flow field plate for fuel cells, comprising:
a cooling field on a first side of said flow field plate, wherein said cooling field having one or more cooling channels;
a reacting field on a second side of said flow field plate, wherein said reacting field having one or more reacting channels;
one or more gas entrances on said first side for providing a gas to the cooling field;
one or more gas exits;
a distributing rib disposed on said first side forming said cooling channels, wherein said distributing rib having one or more distributing rib segments and wherein the distributing rib segments are disposed in the cooling channels and are perpendicular to the distributing rib that forms said cooling channels; and
one or more connecting pores passing through said flow field plate, wherein a part of the gas is diverted from the cooling field to the reacting field via the distributing rib segments and the connecting pores.

2. A flow field plate of claim 1 wherein an end of said cooling field is connected to said gas entrances and another end is connected to said gas exits.

3. A flow field plate of claim 1 wherein the distributing rib is located between the gas entrances and the gas exits.

4. A flow field plate of claim 3 wherein the connecting pores are located between the distributing rib and the gas entrances.

5. A flow field plate of claim 4 wherein one end of the reacting field is connected to said connecting pores and another end of the reacting field is connected to the gas exits.

6. The flow field plate of claim 5 wherein the distributing rib is substantially closer to the gas entrances than the gas exits.

7. A flow field plate of claim 1 wherein one end of the reacting field is connected to said connecting pores and another end of the reacting field is connected to the gas exits.

8. The flow field plate of claim 1 wherein each of the distributing rib segments may be different in shape.

9. A flow field plate of claim 1 wherein the cross-sectional area of said distributing rib is 10%-100% of the cross sectional area of a cooling channel.

10. The flow field plate of claim 1 wherein the thickness of said distributing rib is 0.5%-10% of the length of the cooling channel.

11. The flow field plate of claim 1 wherein the one or more gas entrances are positioned along an edge of the flow field plate, wherein the ratio of the distance from a line that is through the centers of the connecting pores to the edge of the flow field plate where the gas entrances are located and the distance from the line to the distributing rib is in the range of 2:1 to 15:1.

12. A flow field plate for fuel cells, comprising:
a cooling field on a first side of said flow field plate, wherein said cooling field having one or more cooling channels and wherein an end of said cooling field is connected to one or more gas entrances on said first side for providing a gas to the cooling field and another end is connected to one or more gas exits;
a reacting field on a second side of said flow field plate, wherein said reacting field having one or more reacting channels and wherein one end of the reacting field is connected to one or more connecting pores and another end of the reacting field is connected to the gas exits;
a distributing rib disposed on said first side forming said cooling channels, where the distributing rib is located between the gas entrances and the gas exits; wherein said distributing rib is having one or more distributing rib segments and each cooling channel has a distributing rib segment; wherein each of the distributing rib segments may be different in shape; and wherein the distributing rib segments are disposed in the cooling channels and are perpendicular to the distributing rib that forms said cooling channels; and
wherein the connecting pores passing through said flow field plate, wherein the connecting pores are located between the distributing rib and the gas entrances, and wherein a part of the gas is diverted from the cooling field to the reacting field via the distributing rib and the connecting pores.

13. The flow field plate of claim 12 wherein the distributing rib is substantially closer to the gas entrances than the gas exits.

14. The flow field plate of claim 12 wherein the cross-sectional area of said distributing rib is 10%-100% of the cross sectional area of a cooling channel.

15. The flow field plate of claim 12 wherein the thickness of said distributing rib is 0.5%-10% of the length of the cooling channel.

16. The flow field plate of claim 12 wherein the one or more gas entrances are positioned along an edge of the flow field plate, wherein the ratio of the distance from a line that is through the centers of the connecting pores to the edge of the flow field plate where the gas entrances are located and the distance from the line to the distributing rib is in the range of 2:1 to 15:1.

* * * * *